C. STONE.
JEWEL GRINDING MACHINE.
APPLICATION FILED JAN. 5, 1916.
1,338,406.
Patented Apr. 27, 1920.
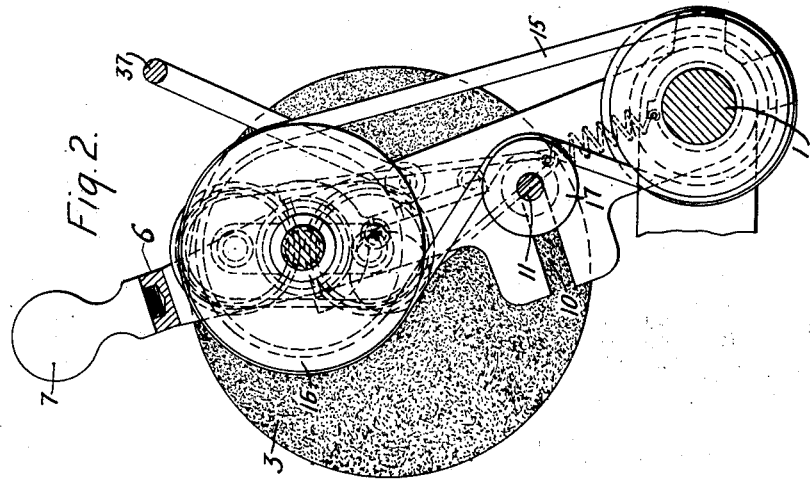
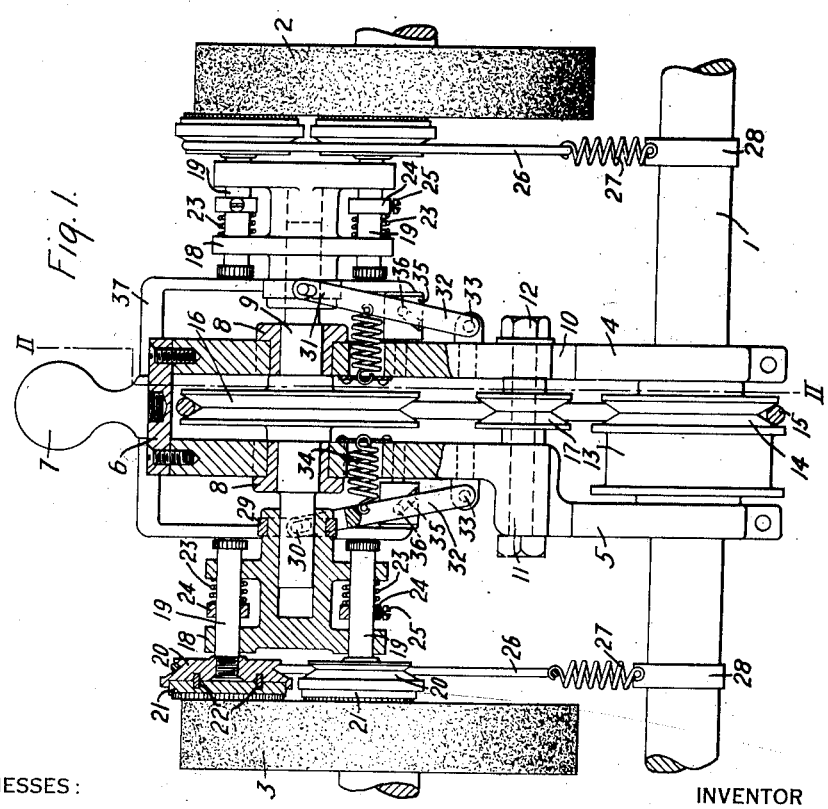
WITNESSES:
Fred. A. Lind
R. D. Brown
INVENTOR
Cecil Stone
BY
Wesley G. Carr
ATTORNEY

UNITED STATES PATENT OFFICE.

CECIL STONE, OF NEWARK, NEW JERSEY, ASSIGNOR TO WESTINGHOUSE ELECTRIC AND MANUFACTURING COMPANY, A CORPORATION OF PENNSYLVANIA.

JEWEL-GRINDING MACHINE.

1,338,406.  Specification of Letters Patent.  Patented Apr. 27, 1920.

Application filed January 5, 1916. Serial No. 70,429.

*To all whom it may concern:*

Be it known that I, CECIL STONE, a citizen of the United States, and a resident of Newark, in the county of Essex and State of New Jersey, have invented a new and useful Improvement in Jewel-Grinding Machines, of which the following is a specification.

My invention relates to machines for grinding and polishing bearing jewels for use in electric measuring instruments and other instruments of precision, and it has for its object to provide a machine for rapidly and accurately grinding flat faces upon bearing jewels and for operating upon a large number of rough jewels simultaneously.

In the accompanying drawing, Figure 1 is a front view, partially in elevation and partially in section, showing a machine constructed in accordance with my invention. Fig. 2 is a side view, partially in elevation and partially in section, of the device shown in Fig. 1, the section being taken substantially along the line II—II of Fig. 1.

The general purpose of my machine is to firmly hold a considerable number of rough jewels, such as sapphires, in close contact with rapidly rotating grinding disks or laps and to produce a complex relative movement between the grinding disk and the jewels in order that the surfaces of the jewels may be evenly ground by strokes in all directions.

The machine shown in the accompanying drawing comprises a main driving shaft 1 mounted in suitable bearings (not shown) and connected by gearing, which is also omitted from the drawing, to rapidly rotate two grinding disks 2 and 3. A frame composed of side pieces 4 and 5, connected at the top by a cross arm 6 and provided with a handle 7, is loosely mounted upon the driving shaft 1 and is provided with bearings 8 for receiving a horizontal shaft 9 and with a slot 10 in which a pin 11 is adjustably secured by means of nuts 12 or otherwise.

Rigidly secured to the shaft 1 between the side pieces 4 and 5 of the swinging frame, is a pulley 13 to which power may be applied by a belt from any convenient source and beside which is secured a second pulley 14. A belt 15 passes around the pulley 14 and around a larger pulley 16 keyed to the shaft 9. A belt-tightening roller 17 is mounted on the pin 11 and serves to maintain the belt under proper tension, as best shown in Fig. 2.

Slidably keyed to each end of the horizontal shaft 9 is a sleeve 18 provided with bearings for supporting two short horizontal shafts 19 which carry, at their outer ends, grooved disks 20 to which jewel holders 21 are adapted to be secured by means of screws 22 or otherwise. Between the bearings which support each of the short shafts 19, and surrounding the shaft, is a compression spring 23, the compression of which is regulated by an adjustable collar 24 secured to the shaft 19 by means of a set screw 25. A cord or belt 26 engages the grooves in the disks 20 and is connected, by means of a tension spring 27, to a collar 28 that loosely surrounds the main driving shaft 1. As each sleeve 18 is rotated by the shaft 9, the short shafts 19 revolve around the axis of this shaft and are given an independent rotation around their own axes by the engagement of the grooved disks with the stationary pulley 26, the tension of which is maintained constant by the spring 27.

The sleeves 18 are adapted to be simultaneously moved longitudinally of the shaft 9 to bring the jewels in the holders 21 into engagement with the laps 2 and 3 or to withdraw the jewels from this engagement. For this purpose, each of the sleeves 18 is provided, near its inner end, with a groove to receive a ring 29 which carries pins 30 having lost-motion connection with a shifting fork 31 carried by a lever 32 that is pivoted at 33 to a lug attached to the swinging frame. Springs 34 normally maintain the shifting forks 31 and the sleeves 18 in such position that the jewels are out of contact with the laps 2 and 3. For the purpose of manually bringing the jewels into contact with the grinding laps, cams 35 are mounted upon pins attached to the side pieces 4 and 5 of the swinging frame and are provided with helical grooves in which are received pins 36 attached to the levers 32. The cams 35 are rotated together by means of a forked handle 37.

In the operation of my machine, the jewel holders 21, which are in the form of shallow pans, are closely packed with rough jewels which are maintained in place by pouring suitable cement over them. The jewel holders are then attached to the disks 20. Power being applied to the main driving shaft 1 and to the laps 2 and 3 which, at the beginning of the operation, should be provided with working faces of copper, the handle 37 is depressed sufficiently to force the sleeves 18 outwardly along the shaft 9 and to bring the jewels into contact with the working faces of the laps. The swinging frame is then oscillated manually by means of the handle 7. The jewels in the holders 21 are thus subjected to a compound grinding movement comprising the rotary movement of the laps, the bodily revolution of the jewel holders around the axis of the shaft 9 and the rotation of the individual jewel holders around the axes of their supporting shafts 19. The direction of rotation of the shaft 9 should be opposite to that of the shafts carrying the laps 2 and 3.

When the initial rough grinding by copper laps is finished, laps of boxwood having working faces treated with diamond dust may be substituted in order to finish the grinding and polishing operation. The jewels, after having one flat side ground in this manner, are transferred to other holders, with their ground sides down, and provided with flat faces parallel to the faces first ground. The jewels are completed by having their sides ground to cylindrical form, for which operation another machine is required.

The structural details of my machine may be variously modified without exceeding the limits of my present invention, and it is therefore to be understood that no limitations are to be imposed upon my invention except such as are indicated in the appended claims.

I claim as my invention:

1. In a machine for grinding bearing jewels and the like, the combination with a holder for the objects to be ground, of a rotary grinding member, and means for moving the said holder to bring the said objects into contact with the said grinding member and for imparting an oscillatory and rotary movement to the said holder while the said objects are in contact with the said grinding member.

2. In a machine for grinding bearing jewels and the like, the combination with a holder for the objects to be ground, of a rotary grinding member, means for moving the said holder to bring the said objects into contact with the said grinding member and means for simultaneously oscillating the said holder and revolving it around an exterior axis while the said objects are in contact with the said grinding member.

3. In a machine for grinding bearing jewels and the like, the combination with a holder for the objects to be ground, of a rotary grinding member, means for moving the said holder to bring the said objects into contact with the said grinding member, and means for simultaneously imparting movements of rotation, revolution and oscillation to the said holder while the said objects are in contact with the said grinding member.

4. In a machine for grinding bearing jewels and the like, the combination with a holder for the objects to be ground, of a rotary grinding member, means for moving the said holder to bring the said objects into contact with a rotating surface of the said grinding member, and means for simultaneously oscillating the said holder, rotating the said holder and revolving it around an exterior axis while the said objects are in contact with the said grinding member.

5. In a machine for grinding bearing jewels and the like, the combination with a holder for the objects to be ground, of a rotary grinding member, means for moving the said holder to bring the said objects into contact with a rotating surface of the said grinding member and for imparting movements of rotation, revolution and oscillation to the said holder while the said objects are in contact with the said grinding member.

6. In a machine for grinding bearing jewels and the like, the combination with a manually oscillatable frame, of a power-driven shaft carried by the said frame, a sleeve slidably mounted upon one end of the said shaft, a holder for the objects to be ground slidably mounted in the said sleeve, a grinding member rotatable upon an axis parallel to the said shaft, and means for manually moving said sleeve to bring the said objects into contact with the said grinding member.

7. In a machine for grinding bearing jewels and the like, the combination with a manually oscillatable frame, of a power-driven shaft carried by said frame, sleeves slidably mounted upon the ends of the said shaft, a holder for the objects to be ground slidably mounted in each of the said sleeves, grinding members rotatable upon an axis parallel to the said shaft and means for manually and simultaneously moving said sleeves to bring the said objects into contact with the said grinding member.

8. In a machine for grinding bearing jewels and the like, the combination with a manually oscillatable frame, of a power-driven shaft carried by the said frame, a sleeve slidably mounted upon each end of the said shaft, a plurality of holders for the objects to be ground supported upon shafts that are mounted in bearings in each of the said sleeves and are yieldingly pressed outward from the said frame, grinding members rotatably mounted adjacent to the said holders upon shafts parallel to the said first-named shaft, and means for manually moving the said sleeves outwardly from the said frame to bring the objects in the said holders into contact with the said grinding members.

9. In a machine for grinding bearing jewels and the like, the combination with a manually oscillatable frame, of a power-driven shaft carried by said frame, a sleeve slidably mounted upon one end of the said shaft, a holder for the objects to be ground supported upon a shaft that is mounted in bearings in the said sleeve, a grinding member rotatable upon an axis parallel to the said shaft, means for manually moving the said sleeve to bring the said objects into contact with the said grinding member, and means for rotating the said holder about its own axis.

10. In a machine for grinding bearing jewels and the like, the combination with a manually oscillatable frame, of a power-driven shaft carried by the said frame, a sleeve slidably mounted upon each end of the said shaft, holders for the objects to be ground supported upon shafts that are mounted in bearings in the said sleeves, grinding members rotatable upon an axis parallel to the power-driven shaft, means for manually and simultaneously moving the said sleeves to bring the said objects into contact with the said grinding members, and means for rotating the said holders about their own axes.

11. In a machine for grinding bearing jewels and the like, the combination with a manually oscillatable frame, of a power-driven shaft carried by the said frame, a sleeve slidably mounted upon each end of the said shaft, a plurality of holders for the objects to be ground supported upon shafts that are mounted in bearings in each of the said sleeves, the said holders being yieldingly pressed outward from the said frame, grinding members rotatably mounted adjacent to the said holders upon shafts parallel to the said first-named shaft, means for manually moving the said sleeves outwardly from the said frame to bring the objects in the said holders into contact with the said grinding members, and means for rotating the said holders about their own axes.

12. In a machine for grinding bearing jewels and the like, the combination with a driving shaft and a manually oscillatable frame mounted on the said shaft, of a driven shaft journaled in the said frame, coöperating pulleys on the said shafts connected by a belt for rotating the said driven shaft, sleeves slidably mounted upon the ends of the said driven shaft, a plurality of holders for the objects to be ground mounted upon short shafts carried in bearings on the said sleeves and spring-pressed outwardly away from the said frame, grinding disks rotatably mounted upon shafts parallel with the said first-named shafts, cams carried by the said frame and operatively connected to the said sleeves for moving them outwardly from the said frame to bring the said objects into contact with the said grinding disks, means for rotating the said holders around their own axes and means for manually operating the said cams.

13. In a machine for grinding bearing jewels and the like, the combination with a rotating grinding member, of a jewel holder movable to bring the jewels which it holds into or out of engagement with the grinding member, means for rotating the jewel holder, means for revolving the jewel holder about an exterior axis, and means for oscillating the jewel holder.

14. In a machine for grinding bearing jewels and the like, the combination with a manually oscillatable frame, of a power driven shaft carried by the frame, a sleeve slidably mounted upon the shaft, a holder supported by the sleeve and eccentric to the shaft and adapted to receive the objects to be ground, a rotary grinding member disposed in opposition to the holder, means for moving the holder toward and away from the grinding member, driving means between the shaft and sleeve and means for rotating the holder about its axis.

In testimony whereof I have hereunto subscribed my name this 28th day of December, 1915.

CECIL STONE.